United States Patent [19]

Naarmann

[11] Patent Number: 4,749,451

[45] Date of Patent: Jun. 7, 1988

[54] ELECTROCHEMICAL COATING OF CARBON FIBERS

[75] Inventor: Herbert Naarmann, Wattenheim, Fed. Rep. of Germany

[73] Assignee: BASF Aktiengesellschaft, Ludwigshafen, Fed. Rep. of Germany

[21] Appl. No.: 11,124

[22] Filed: Feb. 5, 1987

[51] Int. Cl.⁴ .............................................. C25B 3/02
[52] U.S. Cl. ..................... 204/58.5; 204/59 R; 204/28; 204/180.4
[58] Field of Search .............. 204/180.4, 58.5, 28, 204/59 R

[56] References Cited

U.S. PATENT DOCUMENTS

| | | | |
|---|---|---|---|
| 3,902,976 | 9/1975 | Walls | 204/28 |
| 4,050,996 | 9/1977 | Klingenmaier | 204/28 |
| 4,130,465 | 12/1978 | Arai et al. | 204/28 |
| 4,155,816 | 5/1979 | Marencak | 204/28 |
| 4,401,545 | 8/1983 | Naarmann et al. | 204/59 R |
| 4,468,291 | 8/1984 | Naarmann et al. | 204/59 R |
| 4,547,270 | 10/1985 | Naarmann | 204/58.5 |

FOREIGN PATENT DOCUMENTS 467024  6/1937  United Kingdom ................. 204/28

OTHER PUBLICATIONS

Chemical Abstracts, vol. 104, No. 6, Abstract 24415, (corresponding to Surface & Interface Analysis 7 (1985), 252–254.

Primary Examiner—John F. Niebling
Assistant Examiner—Steven P. Marquis
Attorney, Agent, or Firm—Keil & Weinkauf

[57] ABSTRACT

Electroconductive coats are applied by a process wherein the anode and the cathode of an electrolysis bath are composed of carbon fibers, filaments or sheet-like structures therefrom and the electrolyte solution contains a monomer and a conductive salt, the monomer being oxidized at the anode and deposited on the anode as a polymer and the conducting salt used containing a metal as cation, so that the metal is reduced and deposited on the cathode.

3 Claims, 1 Drawing Sheet

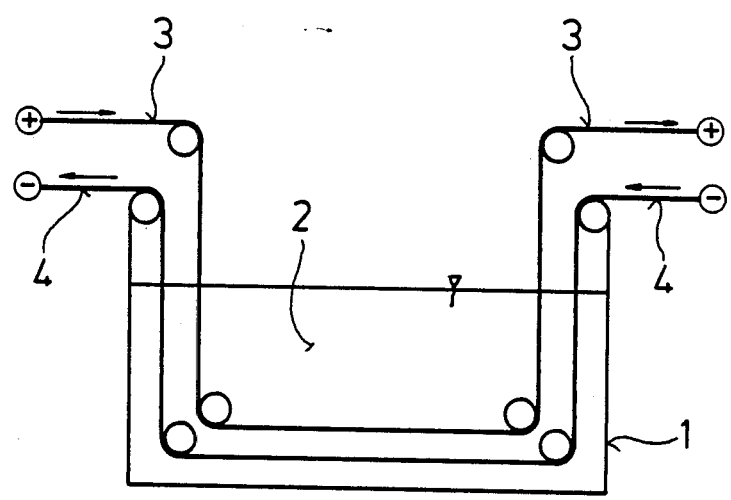

ELECTROCHEMICAL COATING OF CARBON FIBERS

The present invention relates to a process for applying electroconductive coats to carbon fibers or filaments or sheetlike structures therefrom by anodic oxidation of monomers in the presence of conducting salts with deposition of the electroconductive coats on the carbon fibers or filaments or sheetlike structures therefrom.

The elctrochemical polymerization of pyrrole in the presence or absence of comonomers is knwon (c. inter alia U.S. Pat. No. 3,574,072 and No. DE-A-3,049,551). In this prior art, the pyrrol or, as the case may be, the pyrrole/comonomer mixtures are electrolyzed in a generally organic electrolyte solvent in the presence of conducting salts, forming pyrrole polymers by anodic oxidation, which are deposited at the anode. In this prior art, the conducting salts, for example alkali metal, ammonium or phosphonium salts with anions of the group consisting of $BF_4-$, $AsF_6-$, $SbF_6-$, $PF_6-$, $SbCl_6-$, $ClO_4-$. $HSO_4-$ or $SO_4{}^2-$, are at least partially incorporate, probably complexed, in the pyrrole polymers, on which they confer a high electroconductivity of up to about $10^2$ ohm$^{-1}$ cm$^{-1}$.

German patent application No. P 33 27 012 (EP-No. A-84 108,455) discloses a process for the electrochemical polymerization of pyrrole wherein pyrrole is polymerized in the presence of conducting salts in electrolyte solvents bu anodic oxidation on an anode with a sheetlike structure of large surface area, such as a woven or knitted fabric, a mesh or a net.

Earlier German patent application No. P 35 31 019.7 discloses a very advantageous process for applying a coat of electroconductive polymer to carbon fibers or filaments or sheetlinke structures therefrom wherein the fibers or sheetlike structures are first treated with a relatively high molecular weight sulfonic acid, for example with a sulfonic acid of a phthalocyanine, and are then connected as the anode in an electrolysis bath, whereafter the monomers which form the electroconductive layer are polymerized at the anode.

It is an object of the present invention to provide a novel process for applying electroconductive coats to carbon fibers, filaments or sheetlike structures therefrom which is particularly economical to use and leads to electroconductive products which can be used for example as electrical conductors or as electrodes in batteries.

We have found that this object is achieved with a process for applying electroconductive coats to carbon fibers, filaments or sheetlike structures therefrom by anodic oxidation of monomers of the class of the 5-membered heterocycles which contain nitrogen or sulfur as the heteroatom or of the class of the anilines in the presence of a conducting salt and of an electrolyte solvent with deposition of the electroconductive polymer on the anode and by reduction of the cation of the conducting salt with deposition of the metal on the cathode, wherein both the anode and the cathode are composed of carbon fibers, filaments or sheetlike structures therefrom and the conducting salt contains a metallic cation.

It is a particular advantage of the process of the invention that in one operation in one electrolysis bath not only is the polymer deposited on the carbon fibers or sheetlike structures connected as anode but also, at the same time, the metallic cation of the conducting salt is deposited on the carbon fibers or sheetlike structures which are connected as the cathode. Since not only the anodically polymer-coated carbon fibers but also the cathodically metal-coated carbon fibers and sheetlike structures therefrom have favorable electroconductive and good mechanical properties, the fact that this coating is carried out in one operation makes the process particularly economical. In a continous form of the process it is thus possible, for example, to produce coated sheetlike structures which are made of carbon fibers or filaments and can be directly used as electrodes in batteries. The electrochemically applied conductive coats are mechanically firmly adherent, so that the coated material can be turned, rolled or folded without damage.

The carbon fibers or filaments to be used for the process are obtained for example by pyrolytic methods from polyacrylonitrile or by heating polyvinyl alcohol filaments or fabrics to above 600° C. However, the process can also be used to coat sheetlike structures composed of carbon fibers or filaments with an electrically conductive coat of polymer. These sheetlike structures are, for example, woven or knitted fabrics, meshes, nets or nonwoven-type materials. Sheetlike structures of this kind are obtained in a conventional manner, for example from polyesters. These structures are likewise obtainable by pyrrolysis methods if the sheetlike fabrics are used directly in the pyrrolysis process.

The carbon fibers, filaments or sheetlike structures are coated in a solution which contains monomers and conducting salts with the polymer formed from the monomers or with the metal from the conducting salt. The monomers are selected from the class of the 5-membered heterocyclic compounds which contain nitrogen or sulfur as heteroatom and in addition a $\pi$-electron system of conjugated compounds. Examples of these compounds are those of the classes of the pyrroles and the thiophenes. Suitable pyrroles are for example the unsubstituted pyrrole itself and even N-substituted pyrroles such as N-alkylpyrrole. However, it is also possible to use other substituted pyrroles, such as 3,4-dialkylpyrroles or 3,4-dichloropyrroles. Of the compounds of the class of the thiophenes, suitable in particular are the unsubstituted thiophene itself and 2- or 3-alkylthiophenes, for example 2,3-diethylthiophene. These 5-membered heterocyclic compounds, however, can also be polymerized together with other copolymerizable compounds, for example furans, thiazole, oxazole or imidazole. Suitable monomers also include compounds of the class of the anilines, such as aniline, azophenine, p-phenylenediamine or azulene.

Suitable solvents are for example organic solvents, such as methanol, ethanol, polyols, acetone or tetrahydrofuran. But is also possible to use pyridine, acetonitrile, methylene chloride, glacial acetic acid, propylene carbonate or dimethyl sulfoxide. However, it is also possible to employ water or mixtures of water with one of the abovementioned miscible solvents.

The solutions also contain a conducting salt. The concentration of the conducting salt in the process according to the invention ranges in general from 0.001 to 1 mole, preferably from 0.01 to 0.5 mole, of a conducting salt per liter of electrolyte solvent. Particularly advantageous anions for the conducting salt are the tetrafluoroborate, tetrafluoroarsenate, hexafluoroarsenate, hexafluoroantimonate, hexachloroantimonate, hexafluorophosphate, perchlorate, hydrogensulfate or sulfate anion. Particularly favorable conducting salts also include those which contain anions of aromatic sulfonic acids, for example the benzenesulfonic acid anion, the toluenesulfonic acid anion or even anionic, polymeric aromatic sulfonic acid compounds, such as the polystyrylsulfonic acid anion. Even salts of aliphatic or aromatic carboxylic acids, for example acetic acid, propionic acid or benzoic acid, are suitable for use as conductive salts in the process according to the invention, as are sulfated fatty alcohols.

The conducting salts also contain a metallic cation which, for the purposes of the present invention, is a cation which is reduced to a metal at the cathode. Preference is given to alkali metal cations, preferably lithium, sodium or potassium. But it is also possible to use others, for example alkaline earth metal cations or heavy metal cations. Of these preference is given to lead, copper, nickel or noble metals such as silver or platinum. The conducting salts are in general used in the process according to the invention in an amount of from 10 to 40 mol %, based on 1 mole of the monomers to be polymeized. The conducting salts can be used on their own or mixed.

The process according to the invention can be carried out in conventional electrolytic cells or electrolysis apparatuses. Highly suitable examples are simple electrolysis apparatuses comprising a cell without membranes, the two electrodes made of carbon fibers, filaments or sheetlike structures and an external supply of electrical current. Preferably the cathode and anode are constructed as sheets which are arranged parallel to each other. Apart from these simple electrolytic cells without membranes it is also possible to use other electrolysis units for the process according to the invention, for example cells with membranes and those with reference electrodes for exact determination of potential. It is frequently expedient to measure the electric charge (As).

Normally the process according to the invention is carried out at room temperature. However, since the reaction temperature in the process according to the invention has been found to be not critical, said temperature can be varied within a wide range as long as the solidification temperature and the boiling point of the electrolyte solvent are not undershot and overshot respectively. In general a polymerization temperature within the range from 0° to 50° C., in particular from +10° to +30° C., has proved very advantageous.

Suitable sources of electric current for operating the electrolytic cell in which the process according to the invention is carried out are all supplies of direct current, for example a battery, which provide a sufficiently high electric voltage. Customarily the electrochemical polymerization according to the invention is operated with a voltage within the range from 0.1 to 100 volt, preferably within the range from 1.5 to 25 volt. The current density is advantageously within the range from 0.05 to 20 mA/cm$^2$, preferably within the range from 1 to 10 mA/cm$^2$.

The length of the hydrolysis depends inter alia on the monomer used, on the electrolyte system and on the particular electrolysis conditions, but appears in particular also significantly determined by the nature of the desired end product, and therefore can vary within wide limits. In the process according to the invention, the formation of polymer starts on the sheetlike anode elements and in the course of the electrolysis spreads over the entire anode surface. At the cathode, the metal of the metallic cation is precipitated by reduction. Depending on the duration of the process, the process according to the invention can consequently be used to produce different end products.

At the anode the result is a product which contains the polymers embedded in the sheetlike element of the fabric, netting, nonwoven, filament or fibrous structure used as the anode. The process can be controlled in such a way as to stop short of forming a continuous, uniform, surface. In a product of this type, the mechanical and largely also the chemical properties are substantially determined by the carbon carrier material of the nonelectrioconductive sheet element which now has a high electric conductivity. In this version of the process, it is thus possible to vary the electrical properties of the nonelectroconductive sheet element used as anode material.

If, finally, the electrolysis is continued, a continuous, one-piece film surface of electroconductive polymer forms on the carbon anode in a thickness which depends on the duration of electrolysis. In this case, the polymer forms a film which, as a support and carrier material, encloses the carbon element used as the anode.

After the electrolysis the products obtained in the process according to the invention are washed with solvents preferably water or aqueous solvents, to remove adhering conducting salt and are dried at 25°–150° C., preferably under reduced pressure.

An economically particularly advantageous version of the process takes the form of a continuous process wherein the carbon filaments, fibers or sheetlike structures therefrom are passed continuously through an electrolysis bath which contains the conducting salt and solvent in such a way that the carbon elements which are connected as the anode are passed in parallel to the carbon elements connected as the cathode. The continuous anodic oxidation of monomers which leads to conductive polymers is known.

The carbon elements connected as the anode, where the polymers are deposited, have a conductivity within the range from $10^{-1}$ to $10^{+2}$ S/cm. The conductivity of the carbon elements which are connected as the cathode varies greatly, depending on the deposited metal, within the range from $10^{-2}$ to $10^{+2}$ S/cm. As mentioned above, the products obtained by the process according to the invention are electrical conductors which are suitable for producing electric switches, semiconductor components, electrodes for electrochemical storage elements or batteries and as a screening material. The invention is illustrated in more detail by the examples below, where the parts and percentages are by weight, unless otherwise stated.

EXAMPLE 1

FIG. 1 depicts a continuous apparatus which permits simultaneous coating of carbon fiber, nonwovens or wovens. Vessel 1 contains an electrolyte solution 2 which contains the monomer and the conducting salt. A web 3 is connected as the anode which is passed over four rolls through the electrolysis bath. In countercurrent thereto, cathode 4 is likewise guided over four rolls through the electrolysis bath. Both the anode and the cathode comprise a carbon fiber fabric which is passed through the electrolyte at 10 cm/min. The electrolyte comprises 6000 parts of acetonitrile, 55 parts of pyrrole 90 parts of lithium perchlorate and 60 parts of dimethylformamide. The current density at the electrodes is 5.7 mA/cm$^2$. The carbon fiber web taken off at the anode has a coating of polypyrrole incorporating the anions of the conducting salt as counterion. The conductivity of the coated structure is 80 S/cm. The thickness of the coating on the carbon fibers of the fabric is 10 μm.

The countercurrent cation film onto which an equivalent amount of lithium has become deposited is rolled up in the presence of argon as a protective gas and is stored in a sealed container which contains argon. The conductivity of the film is 150 S/cm.

EXAMPLE 2

Example 1 is repeated, except that the electrolyte used contains 6000 parts of acetonitrile, 70 parts of the tributylammonium salt of benzenesulfonic acid, 60 parts of pyrrole and 25 parts of copper sulfate, providing the carbon fiber fabric connected as the cathode with a coating of metallic copper and a conductivity of 7 S/cm.

The same method can be used if the copper sulfate is replaced by lead nitrate. In that case, metallic lead becomes deposited at the cathode.

I claim:

1. In the production of electrodes for batteries, a process for applying an electroconductive coat to carbon fibers or filaments or sheetlike structures therefrom by anodic oxidation of a monomer of the class of the 5-membered heterocycles which contain nitrogen or sulfur ad the heteroatom or of the class of the anilines in the presence of a conducting salt and of an electrolyte solvent with deposition of the electroconductive polymer on the anode and by reduction of the cation of the conducting salt with deposition of the metal on the cathode, wherein both the anode and the cathode are composed of electrically conductive carbon fibers, filaments or sheetlike structures therefrom and the conducting salt contains a metallic cation.

2. A process as claimed in claim 1, wherein the cation is an alkali metal, alkaline earth metal or heavy metal cation.

3. A process as claimed in claim 1, wherein the sheetlinke anode and cathode are passed continuously in parallel through a solution or a dispersion which contains the monomer and the conducting salt.

* * * * *

UNITED STATES PATENT AND TRADEMARK OFFICE
CERTIFICATE OF CORRECTION

PATENT NO. : 4,749,451
DATED : Jun. 7, 1988
INVENTOR(S) : Naarmann

It is certified that error appears in the above-identified patent and that said Letters Patent is hereby corrected as shown below:

Title page, insert

-- [30] Foreign Application Priority Data

Feb. 5, 1986 [DE] Fed. Rep. of Germany 3603373 --

Col. 6, line 6 "ad" should be -- as --

" . ", " 19 "linke" should be -- like --

Signed and Sealed this

Eighteenth Day of October, 1988

Attest:

DONALD J. QUIGG

*Attesting Officer*    *Commissioner of Patents and Trademarks*